(12) United States Patent
Meadows (10) Patent No.: US 9,274,337 B2
(45) Date of Patent: Mar. 1, 2016

(54) METHODS AND APPARATUS FOR CONFIGURING AND USING AN ENHANCED DRIVER VISUAL DISPLAY

(71) Applicant: GM GLOBAL TECHNOLOGY OPERATIONS LLC, Detroit, MI (US)

(72) Inventor: Christopher S. Meadows, Fowlerville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/183,847

(22) Filed: Feb. 19, 2014

(65) Prior Publication Data

US 2015/0234186 A1  Aug. 20, 2015

(51) Int. Cl.
*G02B 27/01* (2006.01)

(52) U.S. Cl.
CPC ...... *G02B 27/017* (2013.01); *G02B 2027/0178* (2013.01)

(58) Field of Classification Search
CPC ............... G02B 27/017; G02B 2027/0178; G02B 27/0172
USPC ............................................... 345/8; 359/630
See application file for complete search history.

(56) References Cited

U.S. PATENT DOCUMENTS

| | | | |
|---|---|---|---|
| 2003/0020707 A1* | 1/2003 | Kangas et al. | 345/418 |
| 2005/0046953 A1* | 3/2005 | Repetto et al. | 359/630 |
| 2008/0120571 A1* | 5/2008 | Chang et al. | 715/810 |
| 2008/0278821 A1* | 11/2008 | Rieger | 359/630 |
| 2009/0005961 A1* | 1/2009 | Grabowski et al. | 701/200 |
| 2010/0075655 A1* | 3/2010 | Howarter et al. | 455/420 |
| 2010/0253602 A1* | 10/2010 | Szczerba et al. | 345/8 |
| 2011/0173002 A1* | 7/2011 | Fujii et al. | 704/246 |
| 2012/0194553 A1* | 8/2012 | Osterhout et al. | 345/633 |
| 2012/0299950 A1* | 11/2012 | Ali et al. | 345/592 |

* cited by examiner

*Primary Examiner* — Koosha Sharifi-Tafreshi
(74) *Attorney, Agent, or Firm* — Ingrassia Fisher & Lorenz, P.C.

(57) ABSTRACT

A method for using a head-mounted display (HMD) associated with a computer system onboard an automobile is provided. The method connects to the HMD over a vehicle-based network; configures a plurality of graphical elements for presentation via the HMD, wherein each of the plurality of graphical elements illustrates detail associated with functionality of the automobile; and presents a display on the HMD comprising the configured plurality of graphical elements.

19 Claims, 5 Drawing Sheets

METHODS AND APPARATUS FOR CONFIGURING AND USING AN ENHANCED DRIVER VISUAL DISPLAY

TECHNICAL FIELD

Embodiments of the subject matter described herein relate generally to enhanced visual displays, and more particularly, embodiments of the subject matter relate to the use of enhanced visual display devices in a vehicle.

BACKGROUND

An enhanced visual display includes any transparent display used to present data to a user without requiring the user to alter the direction of his gaze. More specifically, an enhanced visual display for a vehicle (also referred to as a head-up display (HUD)) is used to provide vehicle operation data and vehicle-specific data, in the form of transparent icons or symbols, to a vehicle-operator. Information provided by the HUD may include travel conditions, weather conditions, navigation data, current speed, and/or vehicle-specific information. Such displays may be integrated into a vehicle itself, or may utilize a head-mounted display (HMD) in communication with a vehicle onboard computer system.

The purpose of the HUD is to provide the information without distracting a vehicle-operator by requiring that he look away from the direction of travel of the vehicle to view it. Accordingly, it is desirable to provide automobile and/or driving data for the assessment of a driver, without requiring the driver to remove his gaze from the road. Furthermore, other desirable features and characteristics will become apparent from the subsequent detailed description and the appended claims, taken in conjunction with the accompanying drawings and the foregoing technical field and background.

BRIEF SUMMARY

A method for using a head-mounted display (HMD) associated with a computer system onboard an automobile is provided. The method connects to the HMD over a vehicle-based network; configures a plurality of graphical elements for presentation via the HMD, wherein each of the plurality of graphical elements illustrates detail associated with functionality of the automobile; and presents a display on the HMD comprising the configured plurality of graphical elements.

A display system for automotive applications is provided. The system includes an onboard computer system, configured to receive user input selections of visual display icons, wherein each visual display icon provides data for an associated automotive feature; and a wearable display device, communicatively coupled to the onboard computer system, configured to: receive a communication signal from the onboard computer system comprising the user input selections; and present the received user input selections of visual display icons in a visual field of the automobile driver.

A vehicle onboard computer system comprising a non-transitory, computer-readable medium containing executable instructions thereon, is provided. When executed by a processor, the executable instructions are configured to execute a method. The method connects to an optical display device using a vehicle-based wireless network, the optical display device configured to be worn by a driver inside a vehicle; receives user input at the vehicle onboard computer system to activate and configure the optical display device; transmits commands to activate and configure the optical display device via the vehicle-based wireless network; and transmits vehicle data for presentation to a user via the optical display device, wherein the vehicle data is obtained by a plurality of vehicle sensors.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus used to create and modify an enhanced visual display for an automobile, presented by a wearable display device in communication with a vehicle onboard computer system. In certain embodiments, a user configures, via the onboard computer system, a plurality of graphical elements associated with various functions and/or conditions of an automobile, for presentation on an enhanced visual display. The enhanced visual display is presented by a wearable display device, which is configured to be worn by the driver of an automobile.

Figure 1:
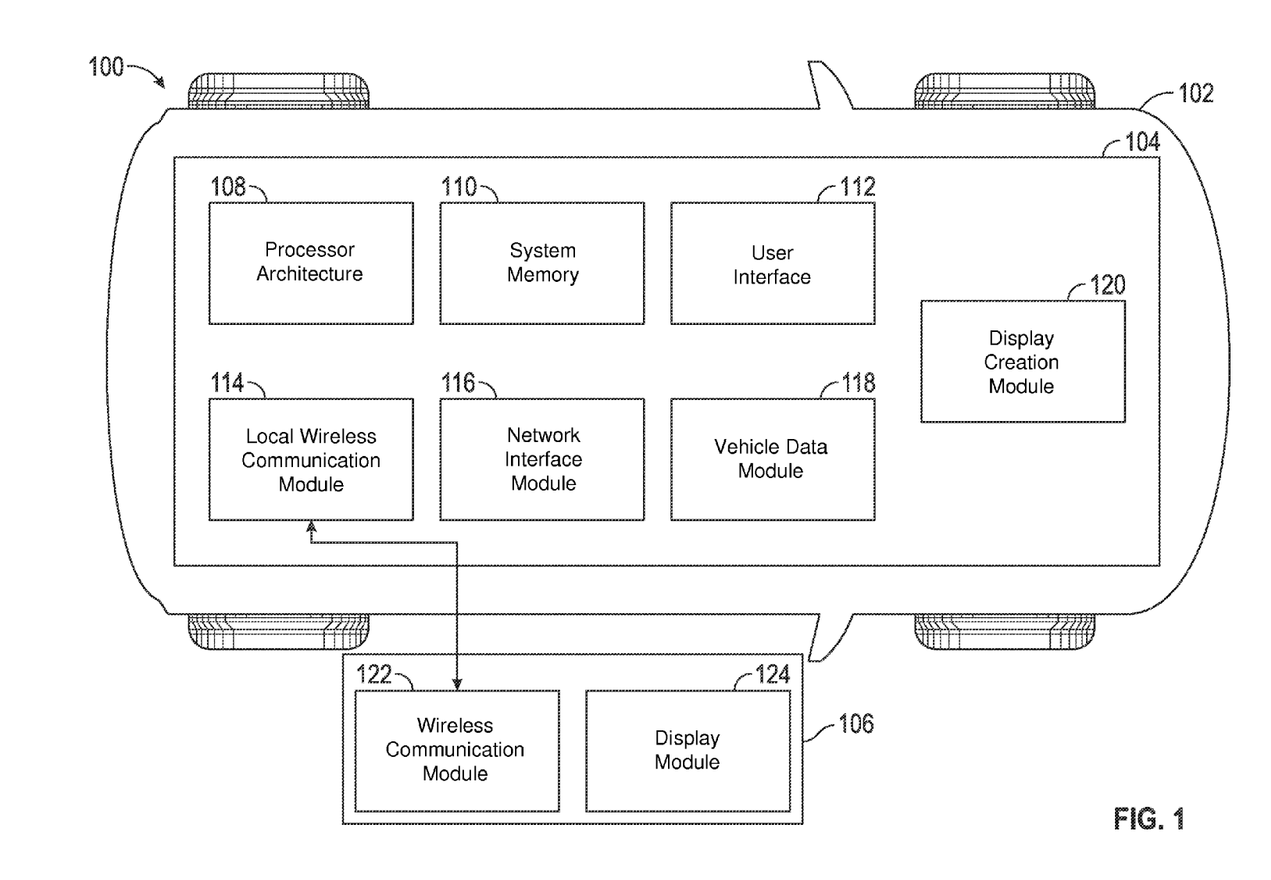
FIG. 1 is a functional block diagram of an enhanced visual display system, in accordance with the disclosed embodiments.

Referring now to the drawings, FIG. 1 is a functional block diagram of an enhanced visual display system 100, including a vehicle 102 including an onboard computer system 104 in communication with a wearable display device 106, in accordance with the disclosed embodiments. The vehicle 102 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

As depicted, the onboard computer system 104 includes, without limitation, a processor architecture 108, a system memory 110, a user interface 112, a local wireless communication module 114, a network interface module 116, a vehicle data module 118, and a display creation module 120. These elements and features of the onboard computer system 104 may be operatively associated with one another, coupled to one another, or otherwise configured to cooperate with one another as needed to support the desired functionality—in particular, creating and using an enhanced visual display system 100 in a vehicle 102, as described herein. For ease of illustration and clarity, the various physical, electrical, and logical couplings and interconnections for these elements and features are not depicted in FIG. 1. Moreover, it should be appreciated that embodiments of the onboard computer system 104 will include other elements, modules, and features that cooperate to support the desired functionality. For simplicity, FIG. 1 only depicts certain elements that relate to the techniques described in more detail below.

The processor architecture 108 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 108 may be realized as one or more microprocessors, controllers, microcontrollers, or state machines. Moreover, the processor architecture 108 may be implemented as a combination of computing devices, e.g., a combination of digital signal processors and microprocessors, a plurality of microprocessors, one or more microprocessors in conjunction with a digital signal processor core, or any other such configuration.

The system memory 110 may be realized using any number of devices, components, or modules, as appropriate to the embodiment. Moreover, the onboard computer system 104 could include system memory 110 integrated therein and/or system memory 110 operatively coupled thereto, as appropriate to the particular embodiment. In practice, the system memory 110 could be realized as RAM memory, flash memory, EPROM memory, EEPROM memory, registers, a hard disk, a removable disk, or any other form of storage medium known in the art. In certain embodiments, the system memory 110 includes a hard disk, which may also be used to support functions of the onboard computer system 104. The system memory 110 can be coupled to the processor architecture 108 such that the processor architecture 108 can read information from, and write information to, the system memory 110. In the alternative, the system memory 110 may be integral to the processor architecture 108. As an example, the processor architecture 108 and the system memory 110 may reside in a suitably designed application-specific integrated circuit (ASIC).

The user interface 112 may include or cooperate with various features to allow a user to interact with the onboard computer system 104. Accordingly, the user interface 112 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the onboard computer system 104. For example, the user interface 112 could be manipulated by an operator to select an enhanced visual display software application, and configure user-selectable graphical elements (each specific to an aspect of functionality of the automobile) for display using a wearable display device, as described in more detail below.

The local wireless communication module 114 is suitably configured to provide a local wireless network for the transmission of signals between one or more devices within a wireless range of the onboard computer system 104. For example, the local wireless communication module 114 generates a local wireless communication network that is used to communicate data between an onboard computer system 104 and a wearable display device 106. In some embodiments, the local wireless communication module 114 generates a WLAN network that is compatible with an IEEE 802.11 standard, and in other embodiments, the local wireless communication module 114 may generate an ad-hoc network, a Bluetooth network, a personal area network (PAN), or the like.

The network interface module 116 is suitably configured to communicate data between the onboard computer system 104 and one or more remote servers. As described in more detail below, data received by the network interface module 116 may include, without limitation: downloadable software applications, GPS location data, data associated with road/driving conditions, weather data, and other data compatible with the onboard computer system 104 and for use with the enhanced visual display. Data provided by the network interface module 116 may include, without limitation: requests to download software applications; requests to obtain data detailing road/driving conditions; requests to obtain weather data; requests to obtain GPS data; and the like.

Generally, the network interface module 116 communicates using different protocols than that of the local wireless communication module 114. In this regard, the communication network utilized by the network interface module 116 may be physically and/or logically distinct from the network utilized by the local wireless communication module 114 to establish the communication between devices onboard a vehicle 102. For example, the local wireless communication module 114 creates a first network that may be realized as an ad-hoc network, a Bluetooth network, a PAN, or a WLAN or the like, while the network interface module 116 utilizes a network that is realized as the Internet, a cellular network, a broadband network, a wide area network, or the like.

The vehicle data module 118 is suitably configured to communicate with a variety of vehicle sensors and systems to acquire data, which is then transmitted to the display creation module 120 for further use. Vehicle sensors providing data to the vehicle data module 118 may include a speedometer, thermometer, tachometer, infrared (IR) sensors, global positioning system (GPS) or other navigation system, and the like. Other environmental/automotive parameters may also be detected and reported by the vehicle data module 118. In certain embodiments, the vehicle data module 118 is configured to also communicate with the network interface module 116 to obtain additional data regarding road/driving conditions, weather conditions, navigation data, and the like from one or more remote servers. Once each sensor collects data reflecting a current condition of the vehicle, etc., it is available for reporting to the display creation module 120.

Exemplary embodiments of the vehicle data module 118 may acquire data including, without limitation: tire pressure; spare tire pressure; radiator fluid level; parasitic current; battery state of charge; fuel level; wiper fluid level; current driver identification; seat inclination; radio status (on/off); portable electronic device status and/or presence; child seat presence;

compact disc presence and/or title; accessory power outlets (APO) usage; glove box/storage bin open/closed status; key presence; reading map lights status; inside and outside temperatures; parking brake status; seat status; occupant detection; closure release switch request; valet mode status; steering column status; child security lock status; folding seat back status; power mode status; suspension level; trailer presence; sunshade status; rear cargo cover status; cyber-attack (e.g., phone calls into vehicle); door handle actuation; articulating running board (ARB) status/requests; cargo lamps; power takeoff status; tire jack status; exterior/interior/hazard lights; heating, ventilating, and air conditioning (HVAC) setting and status; gear status (manual and automatic); fuel door and/or cap open/close status; transmission fluid level; oil level and temperature; off side rear view mirror (OSRVM) fold open/close status; condenser/radiator/fan modules (CRFM) status; engine air-cleaner condition; cabin air filter condition; $O_2$ sensor status; catalytic converter life remaining status; airbag/seatbelt functional status; vehicle perimeter disturbance; Wi-Fi status; security status breach (e.g., window broken, etc.); unauthorized vehicle movement; brake fluid level; brake pad life; driveline status (2WD/AWD/4WD); axle and transfer case fluid level and life; clock setting and time zone.

The vehicle data module 118 polls the vehicle sensors continuously, at time intervals that have been pre-determined. In certain embodiments, the vehicle data module 118 also retrieves information from one or more applicable remote servers via the network interface module 116. The specific length of a time interval for this polling and/or retrieval process is a design parameter and, in some embodiments, is selected and programmed into the system according to the preference of the designer. In other embodiments, the time interval for polling the vehicle sensors and/or retrieving data from one or more remote servers may be chosen to optimize performance of the enhanced visual display system 100 of the vehicle 102.

The display creation module 120 is configured to receive vehicle data from the vehicle data module 118 and configuration information from a user, and to create an enhanced visual display using this information. The enhanced visual display may be utilized to graphically render information, data, icons, and/or other visual content to the user. In certain embodiments, the enhanced visual display illustrates real-time vehicle data selected by the user, and is communicated to a wearable display device 106 for presentation to the user.

An enhanced visual display is generally composed of a plurality of icons or symbols (i.e., graphical elements) illustrating various data items chosen by a driver of the vehicle 102. A user may configure the enhanced visual display to present selected graphical elements, while opting out of using other available graphical elements. The enhanced visual display is rendered on the inside of a wearable display device 106. The driver of an automobile is generally looking toward the direction of travel of the automobile, and the enhanced visual display is configured to accommodate the size and shape of the windshield area in the visual field of the driver.

The enhanced visual display appears in the windshield area of the vehicle. Space on the windshield is limited, and the number of graphical elements which may be selected for display is therefore limited to a predetermined maximum. In accordance with the exemplary embodiment presented here, each graphical element represents data associated with a particular vehicle function or environmental condition applicable to use of the vehicle, permitting the user to make informed decisions when driving. Because the graphical elements are configured to appear on the windshield, the driver is not required to take his eyes off the road to view selected vehicle data. In certain embodiments, all displayed graphical elements may be presented as transparent images on the windshield. In some embodiments, a graphical element may be positioned on the periphery of the windshield, and may be presented as a solid image due to its position. Similarly, in some embodiments, a graphical element may be positioned directly in the line of sight of the driver, toward the center of the windshield, and may be presented as a transparent image due to its position.

Available graphical elements may include those detailing vehicle speed, weather conditions, road conditions, GPS/navigation data, hazard warnings, and/or vehicle conditions (e.g., low oil, low gas, high engine temperature, etc.). A detailed, though non-limiting, list of exemplary embodiments of potential graphical elements for display is presented above with reference to the vehicle data module 118, and will not be redundantly described here. In addition to a standard set of graphical elements generally available to a user for selection and either transparent or solid display, the display creation module 120 may utilize special, alert icons to present alerts or warnings to a driver. These alert icons may be used to call the attention of the driver to a condition of the vehicle or to driving conditions of particular, time-sensitive importance. For example, an alert icon may be used to warn the driver of a low level of gasoline, a high engine temperature, low tire pressure, or other high-priority condition requiring attention. Alert icons may be presented using contrasting visual characteristics, such as a solid icon positioned in the middle of the windshield, a brightly-colored graphical element, a flashing graphical element, and the like.

Graphical elements are selected for use by the display creation module 120 according to input from a user. The display creation module 120 may configure the enhanced visual display before and/or during use, selecting and removing a variety of graphical elements for display as often as user input is received. Before use, the enhanced vehicle display may be configured using a software application installed on the vehicle onboard computer system 104 or a separate computer system communicatively coupled to the wearable display device 106. During use, the enhanced visual display may be configured using the vehicle onboard computer system 104. Generally, the addition or removal of graphical elements is completed via the user interface 112 of the onboard computer system 104. However, in certain embodiments, voice commands from a user, in combination with voice recognition capabilities of the vehicle onboard computer system 104, may be used to configure the enhanced visual display. In some embodiments, a voice command may clear the enhanced visual display of graphical elements, rendering the line of sight of the driver free from obstruction. In this example, when a voice command is received and interpreted by the vehicle onboard computer system 104, the display creation module 120 applies the instructions to the enhanced visual display and transmits the new enhanced visual display data to a wearable display device 106.

In certain embodiments, the display creation module 120 may be located in a computer system that is separate and distinct from the vehicle onboard computer system 104. In this case, a wearable display device 106 is configured using a separate computer system, such as a laptop or other computing device (e.g., tablet, smartphone, netbook, desktop computer, etc.). The wearable display device 106 uses two categories of information to present an enhanced visual display to a user: (1) user configuration data, and (2) vehicle data. The user configuration data dictates which graphical elements are selected by a user for display on the enhanced visual display, and the vehicle data provides the vehicle-specific, real-time information required for each graphical element to present. When the display creation module 120 is located outside of the vehicle onboard computer system 104, the wearable display device receives the configuration information from this other computer system.

Figure 2:
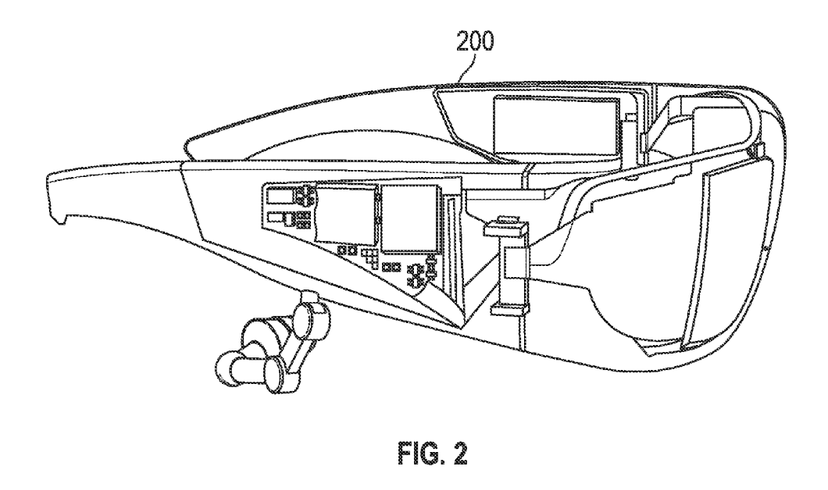
FIG. 2 is a diagram of an embodiment of a wearable display device.

Whether the enhanced visual display is configured by a user using the onboard computer system 104 or a separate computer system, the vehicle onboard computer system 104 communicates vehicle data with a wearable display device 106 to provide the user-configured enhanced visual display for presentation to the user. In exemplary embodiments, the wearable display device 106 may be implemented as a pair of glasses, goggles, or similar optical display device worn in front of the eyes and configured to present an enhanced visual display to the user for viewing while driving. FIG. 2 illustrates an exemplary embodiment of a wearable display device 200. In this example, the wearable display device 200 is an optical display device in the form of a pair of glasses, which includes internal circuitry and hardware capable of presenting the enhanced user display in the visual field of the wearer. The wearable display device 200 displayed in FIG. 2 utilizes technology that is well-known to those of ordinary skill in the art, and will not be unnecessarily described here.

Referring back to FIG. 1, in certain embodiments, the wearable display device 106 may be configured for communication with a single vehicle 102. For example, the wearable display device 106 may be assigned to a specific vehicle identification number (VIN), possessing the capability of presenting an enhanced visual display collaboratively with the vehicle onboard computer system 104 associated with that particular VIN only. However, in other embodiments, the wearable display device 106 may be used in any vehicle, and may collaborate with any compatible onboard computer system 104 to present the enhanced visual display.

The wearable display device 106 includes, without limitation: a wireless communication module 122 and a display module 124. The wireless communication module 122 is suitably configured to send and receive data with a vehicle onboard computer system 104 over a vehicle-generated local wireless network. The wireless communication module 122 may utilize a wireless transmitter and a wireless receiver, configured to communicate according to a standard compatible for use with the local wireless communication module 114. In some embodiments, the wireless communication module 122 uses an IEEE 802.11 standard, and in other embodiments, uses an ad-hoc network, a Bluetooth network, a personal area network (PAN), or the like.

The display module 124 is configured to utilize data received from the onboard computer system 104 to present the enhanced visual display to a user. The enhanced visual display is configured by the display creation module 120 at the vehicle onboard computer system. Graphical element selections received as user input, along with appropriate vehicle data collected by the vehicle data module 118, are utilized to create the enhanced visual display. Once created, the enhanced visual display is communicated to the display module 124, which utilizes appropriate hardware to present the enhanced visual display to the user. Appropriate hardware is determined by the particular HUD technology used, which may include, without limitation: the use of a cathode ray tube (CRT) to generate an image on a phosphor screen; the use of a solid state light source which is modulated by an LCD screen to display an image; the use of optical waveguides to produce images directly in a combiner rather than using a projection system; and the use of a scanning laser to display images on a clear transparent medium.

Figure 3:
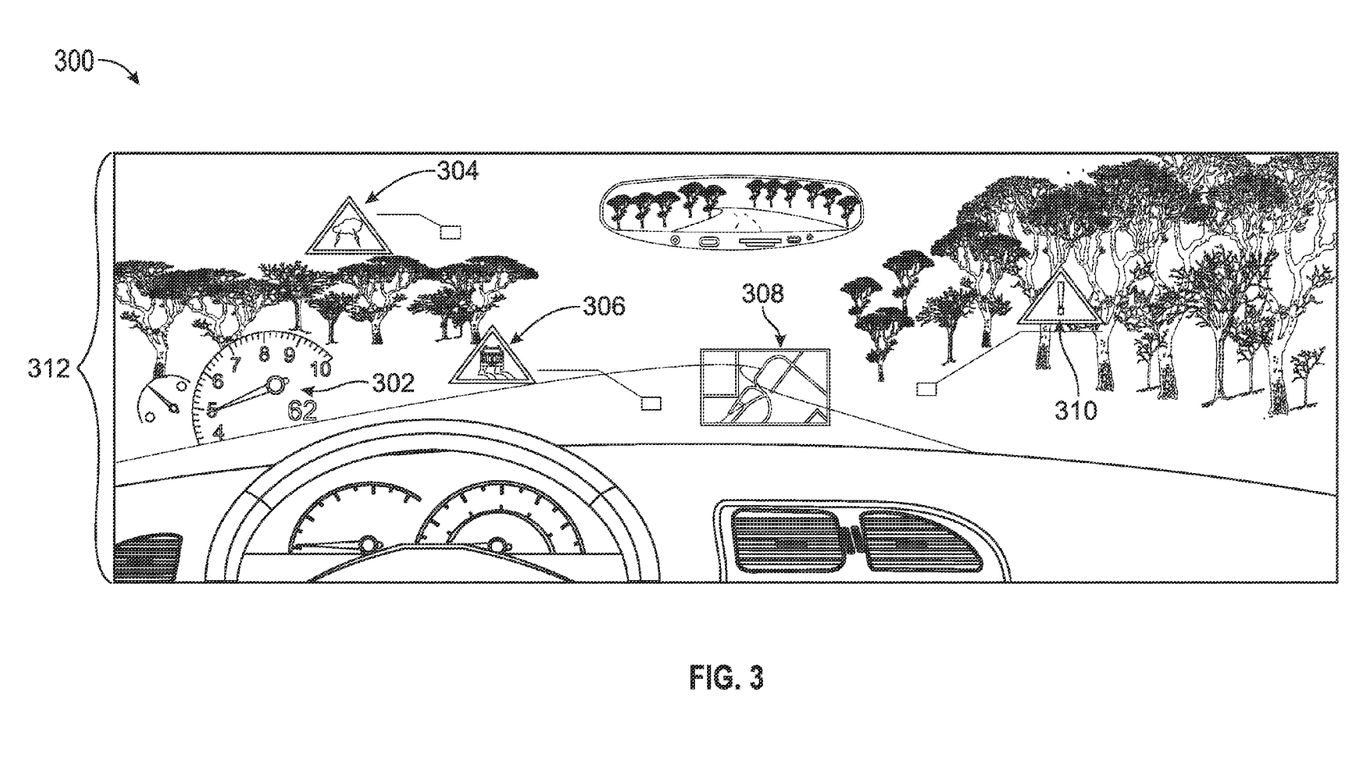
FIG. 3 is a diagram of an enhanced visual display, in accordance with an embodiment.

FIG. 3 is a diagram of an enhanced visual display 300, in accordance with an embodiment. As shown, an enhanced visual display 300 presents user-selected graphical elements on the inside of a wearable display device, to appear on a windshield 312 when a driver directs his gaze toward the direction of travel. Selected graphical elements may be transparent or solid, dependent upon their location in the enhanced visual display 300, and the graphical elements are updated in real-time, via communication with an onboard computer system.

A dashboard icon 302 depicts a current vehicle speed, a tachometer displaying revolutions per minute (RPM), and a gasoline gauge displaying a fuel level for the vehicle. A weather conditions icon 304 depicts a warning regarding current weather conditions outside the vehicle. In this example, the weather appears cloudy with impending rainfall, and the weather conditions icon 304 illustrates a thunderstorm warning. A road conditions icon 306 depicts a warning regarding current road conditions which are potentially dangerous. In this example, the road conditions icon 306 presents a warning for wet roads. A navigation system icon 308 depicts GPS or other navigation data to a driver, providing mapping and/or directions during travel. A caution icon 310 calls attention to a current, potential driving obstacle, such as a stalled car or a tree that has fallen into the road.

Figure 4:
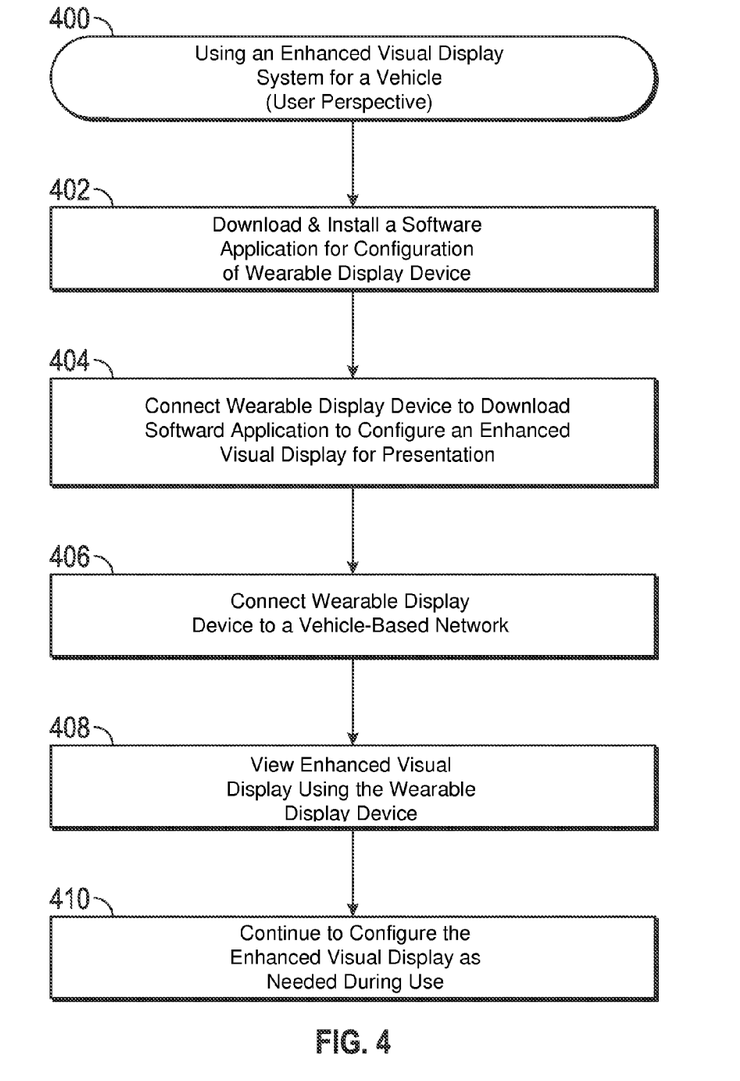
FIG. 4 is a flowchart that illustrates an embodiment of a process for using an enhanced visual display system for a vehicle, in accordance with the disclosed embodiments.

FIG. 4 is a flowchart that illustrates an embodiment of a process 400 for using an enhanced visual display system for a vehicle, in accordance with the disclosed embodiments. For ease of description and clarity, this example assumes that the process 400 begins when a user downloads and installs a software application for configuration of a wearable display device (step 402). In some embodiments, the software application may be a standalone application, and in other embodiments, the software application may be selected from a software application ecosystem, which includes a plurality of downloadable software applications. Generally, the software application includes drivers, control software, etc. that provide functionality for a vehicle-based enhanced visual display system. The software application may include one or more of the following features, without limitation: a graphical user interface (GUI), a list of all user-selectable graphical elements, a previously stored configuration of graphical elements, a user-configurable list of alert icons, selections for configuring visual characteristics for individual and/or collective groups of graphical elements, and the like.

Next, the user connects the wearable display device to the downloaded software application to configure an enhanced visual display for presentation by the wearable display device (step 404). The wearable display device may include any compatible head-mounted display (HMD) or wearable device configured to use head-up display (HUD) technology. Once connected, the user may select graphical elements for display, select alert icons for display under user-defined conditions, configure visual characteristics for graphical elements, etc. In certain embodiments, the user connects the wearable display device to a laptop or other personal device in order to complete the configuration prior to use. In this example, the wearable display device may be connected to a laptop, via cable or wireless connection, at which a user may enter all configurable parameters, including selections of graphical elements to view, selections of alert icons, position of graphical elements, etc. Configuration data entered on the laptop is transmitted to the wearable display device for future use, and the wearable display device is disconnected from the laptop once configuration is complete. In other embodiments, the user connects the wearable display device directly to the vehicle onboard computer system for both configuration and use (described below with regard to the next step).

After configuring the enhanced visual display (step 404), the user connects the wearable display device to a vehicle-based network (step 406), for operation of the device. Here, if the wearable display device is configured at the vehicle onboard computer system, then it is already connected to the vehicle-based network and the connection is simply maintained for use of the device. However, in embodiments where configuration of the wearable display device takes place at a separate computer system, then a new connection to the vehicle onboard computer system must be established to operate the device during driving. In certain embodiments, the wearable display device is connected using a wireless network connection, and in other embodiments, the wearable display device is plugged into the onboard computer system using a cable.

Next, the user views the enhanced visual display using the wearable display device (step 408). The wearable display device presents the configured enhanced visual display inside one or more lenses for viewing by the wearer of the device. Presentation of the enhanced visual display creates the illusion that the enhanced visual display appears on the inside of the windshield of the vehicle, as perceived by the user who is operating the vehicle while wearing the configured, activated, and connected device.

While viewing the enhanced visual display using the wearable display device (step 408), the user may continue to configure the enhanced visual display, as needed during use (step 410). In embodiments where configuration of the wearable display device occurs at the vehicle onboard computer system, the user may perform "on the fly" configuration of the device throughout use. In addition, in embodiments where the onboard computer system has voice recognition capabilities, a voice command from the user may clear the entire enhanced visual display. This allows the user to remove all graphical elements from his field of vision quickly, by articulating a command, which is useful in situations requiring the complete attention of the user (e.g., when an obstruction appears in the road or when a user requires the full field of vision, etc.). In certain embodiments, an additional voice command may restore the removed graphical elements to the enhanced visual display.

Figure 5:
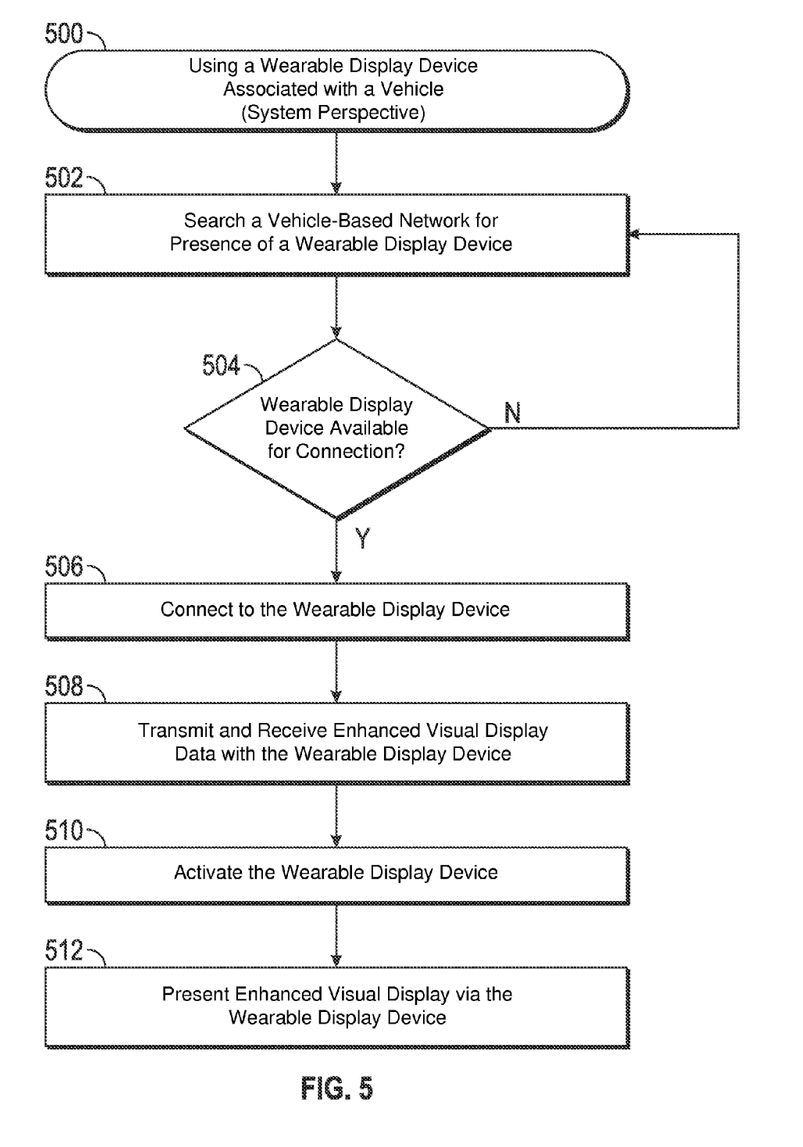
FIG. 5 is a flowchart that illustrates an embodiment of a process for using a wearable display device associated with a vehicle, in accordance with the disclosed embodiments.

FIG. 5 is a flowchart that illustrates an embodiment of a process 500 for using a wearable display device associated with a vehicle, in accordance with the disclosed embodiments. The various tasks performed in connection with process 500 may be performed by software, hardware, firmware, or any combination thereof. For illustrative purposes, the following description of process 500 may refer to elements mentioned above in connection with FIGS. 1-3. In practice, portions of process 500 may be performed by different elements of the described system. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

The process 500 begins by searching a vehicle-based network for a wearable display device (step 502), to determine whether a wearable display device is available for connection (step 504). In certain embodiments, the vehicle-based network is a wireless network. If a wearable display device is not detected (the "No" branch of 504), then the process 500 continues searching the vehicle-based network for a wearable display device (step 502). Generally, a wearable display device is configured to communicate with a vehicle onboard computer system for one vehicle, and may utilize a vehicle identification number (VIN) to restrict use to a particular vehicle. In this case, the wearable display device is identified as compatible or not compatible with the vehicle onboard computer system when its presence is detected. If compatible, then the wearable display device is determined to be available for connection. For example, if the process 500 detects more than one candidate device within wireless range of the vehicle-based wireless network, then the process 500 determines whether each is associated with an appropriate VIN for use within the vehicle. If a candidate device is associated with an appropriate VIN, then the process 500 identifies the candidate device as compatible; if a candidate device is not associated with an appropriate VIN, then the process 500 identifies the candidate device as not compatible. If not compatible, then the wearable display device is determined to be unavailable for connection, and the process 500 continues searching the vehicle-based network for the presence of a compatible, wearable display device.

If a wearable display device is available for connection (the "Yes" branch of 504), then the process 500 initiates connection to the wearable display device (step 506). This connection provides a way for vehicle data to be transmitted from the onboard computer system to the wearable display device, for real-time updating of the enhanced visual display.

After connection to the wearable display device (step 506), the process 500 initiates communication of enhanced visual display data between the wearable display device and the vehicle onboard computer system (step 508). For embodiments where the wearable display device has been configured using a separate computer system, the process 500 initiates communication of the configuration information from the wearable display device to the vehicle onboard computer system, so that applicable vehicle data may be transmitted from the onboard computer system to the wearable display device. The enhanced visual display requires user-configuration data and real-time vehicle data to present the enhanced visual display to a user. In this case, the configuration data is already at the wearable display device, and applicable real-time vehicle data will need to be continually communicated to the wearable display device.

For embodiments where the wearable display device has not been configured using a separate computer system, at this point the process 500 requests user input to configure the enhanced visual display. At this point, a user may select graphical elements for display, configure alert icons to appear and contrasting visual characteristics for each, and select a position on the display for each graphical element to appear. Space on the enhanced visual display is limited, due to limited space on the windshield, and the number of graphical elements which may be selected for display is therefore limited to a predetermined maximum. If the user exceeds the predetermined maximum, the process 500 transmits a warning message to the user, so that the user is informed to make his selections within the predetermined maximum number. Next, the process 500 initiates communication of the received user-configuration data, along with applicable real-time vehicle data, from the vehicle onboard computer system to the wearable display device.

Next, the process 500 activates the wearable display device (step 510), and presents the configured enhanced visual display via the wearable display device (step 512). The wearable display device uses the configuration information to determine which graphical elements are presented to the user, and uses the vehicle data to customize the selected graphical elements while displayed. Presentation of the enhanced visual display is a continuous process, and the wearable display device is continually receiving vehicle data and updating the presented graphical elements accordingly.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using a head-mounted display (HMD) associated with a computer system onboard an automobile, the method comprising:
   connecting to the HMD over a vehicle-based network;
   configuring a plurality of graphical elements for presentation via the HMD, wherein each of the plurality of graphical elements illustrates detail associated with functionality of the automobile;
   presenting a display on the HMD comprising the configured plurality of graphical elements;
   determining a maximum number of the plurality of graphical elements for the HMD, wherein the display on the HMD is limited to the maximum number due to limited available display space; and
   when the maximum number of the plurality of graphical elements has been selected and presented on the HMD, transmitting a warning message for presentation to the driver on the HMD.

2. The method of claim 1, wherein the vehicle-based network comprises a vehicle-based wireless network.

3. The method of claim 2, further comprising:
   detecting the HMD within a wireless range of the vehicle, wherein the connecting step is performed after detecting the HMD.

4. The method of claim 2, wherein the connecting step further comprises:
   detecting a set of candidate HMDs within wireless range of the vehicle-based wireless network; and
   selecting the HMD from the set of candidate HMDs, for connection over the vehicle-based wireless network.

5. The method of claim 2, wherein the connecting step further comprises:
   detecting a set of candidate HMDs within wireless range of the vehicle-based wireless network, wherein each of the set of candidate HMDs is associated with a specific vehicle identification number (VIN); and
   selecting the HMD from the set of candidate HMDs, based on an associated VIN, for connection over the vehicle-based wireless network.

6. The method of claim 1, wherein the configuring step further comprises:
   receiving a voice command, at the computer system, for configuring the plurality of graphical elements for presentation via the HMD;
   utilizing a voice recognition capability of the computer system, for processing the received voice command to generate an HMD command; and
   transmitting the HMD command to the HMD.

7. The method of claim 1, further comprising:
   determining a location for one of the plurality of graphical elements on the display; and
   when the determining step determines that the location comprises a peripheral position on the display, configuring the one of the plurality of graphical elements to be presented as a solid image.

8. The method of claim 1, further comprising:
   determining a location for one of the plurality of graphical elements on the display; and
   when the determining step determines that the location comprises a line of sight position, configuring the one of the plurality of graphical elements to be presented as a transparent image.

9. The method of claim 1, wherein the step of configuring operational parameters for the HMD further comprises designating an alert icon, configured to appear on the display under predefined alert conditions; and
   when the predefined alert conditions are met, after the presenting step is completed, displaying the alert icon on the display using contrasting visual characteristics.

10. A display system for automotive applications, comprising:

an onboard computer system, configured to receive user input selections of visual display icons, wherein each visual display icon provides data for an associated automotive feature; and a wearable display device, communicatively coupled to the onboard computer system, configured to:

receive a communication signal from the onboard computer system comprising the user input selections; and present the received user input selections of visual display icons in a visual field of the automobile driver;

wherein the onboard computer system is further configured to:

determine a maximum number of the visual display icons for the wearable display device, wherein the visual field presented via the wearable display device is limited to the maximum number due to limited available display space; and when the maximum number of the visual display icons has been selected and presented on the wearable display device, transmit a warning message for presentation to the driver on the wearable display device.

11. The enhanced visual display system of claim 10, wherein the onboard computer system is further configured to host and execute a downloadable software application to process the received user input selections; and wherein the downloadable software application is accessible to a user via a user interface of the onboard computer system.

12. The enhanced visual display system of claim 10, wherein the onboard computer system is further configured to:

obtain automotive data from an onboard sensor; and associate the automotive data with an appropriate one of the visual display icons;

wherein the presenting step further comprises presenting the associated automotive data to the automobile driver with the appropriate one of the visual display icons.

13. The enhanced visual display system of claim 10, wherein the onboard computer system is further configured to:

acquire Global Positioning Satellite System (GPS) data associated with operation of an automobile; and associate the GPS data with an appropriate one of the visual display icons;

wherein the presenting step further comprises presenting the associated GPS data to the automobile driver with the appropriate one of the visual display icons.

14. The enhanced visual display system of claim 10, wherein the onboard computer system is further configured to:

receive automotive sensor data requiring a display alert;

associate the automotive sensor data with an appropriate one of the visual display icons; and transmit the automotive sensor data and the appropriate one of the visual display icons to the wearable display device for presentation in the visual field of the driver using contrasting visual characteristics.

15. The enhanced visual display system of claim 10, wherein the onboard computer system is further configured to:

connect to a remote server to download and use a software application; and associate data from the software application with an appropriate one of the visual display icons to be presented by the wearable display device;

wherein the presenting step further comprises presenting the associated data to the automobile driver with the appropriate one of the visual display icons.

16. A vehicle onboard computer system comprising a non-transitory, computer-readable medium containing executable instructions thereon, which, when executed by a processor, are configured to execute a method comprising:

connecting to an optical display device using a vehicle-based wireless network, the optical display device configured to be worn by a driver inside a vehicle;

receiving user input at the vehicle onboard computer system to activate and configure the optical display device;

transmitting commands to activate and configure the optical display device via the vehicle-based wireless network;

transmitting vehicle data for presentation to a user via the optical display device, wherein the vehicle data is obtained by a plurality of vehicle sensors;

determining a maximum number of display icons for the optical display device, wherein the vehicle data presentation presented via the optical display device is limited to the maximum number due to limited available display space; and when the maximum number of display icons has been selected and presented on the optical display device, transmitting a warning message for presentation to the driver on the optical display device.

17. The non-transitory, computer-readable medium of claim 16, wherein the commands to configure the optical display device comprise selecting a plurality of display icons for presentation to the driver via the optical display device; and wherein the plurality of display icons are associated with a subset of the vehicle data, and the subset of the vehicle data is displayed using the selected plurality of display icons.

18. The non-transitory, computer-readable medium of claim 16, wherein the method further comprises:

receiving user input at the vehicle onboard computer system to clear the optical display device; and transmitting a command to clear the optical display device via the vehicle-based wireless network.

19. The non-transitory, computer-readable medium of claim 16, wherein the executable instructions comprise a downloadable software application maintained by a remote server system.

* * * * *